United States Patent [19]

Tiesler

[11] Patent Number: 5,495,693
[45] Date of Patent: Mar. 5, 1996

[54] VEHICLE DOOR ASSEMBLY

[75] Inventor: Roy F. Tiesler, Troy, Mich.

[73] Assignee: General Motors Corporation, Detroit, Mich.

[21] Appl. No.: 359,126

[22] Filed: Dec. 19, 1994

[51] Int. Cl.⁶ .................................................. B60J 5/04
[52] U.S. Cl. ........................................ 49/502; 296/146.3
[58] Field of Search ............................. 49/502, 40, 41; 296/146.2, 146.3

[56] References Cited

U.S. PATENT DOCUMENTS

| | | |
|---|---|---|
| D. 255,347 | 6/1980 | Longeway et al. . |
| 3,803,762 | 4/1974 | Abeel et al. .............................. 49/40 X |
| 4,407,540 | 10/1983 | Korff . |
| 4,473,252 | 9/1984 | Tomforde et al. . |
| 4,648,205 | 3/1987 | Ono . |
| 4,709,957 | 12/1987 | Ohya ................................. 296/146.3 X |
| 4,801,172 | 1/1989 | Townsend .............................. 49/40 X |
| 4,927,207 | 5/1990 | Kishino . |
| 4,988,142 | 1/1991 | Chandler et al. . |
| 5,095,655 | 3/1992 | Warren . |

FOREIGN PATENT DOCUMENTS

| | | | |
|---|---|---|---|
| 3236751 | 4/1984 | Germany ............................ 296/146.3 |
| 8063515 | 4/1983 | Japan ................................. 296/146.3 |

*Primary Examiner*—Kenneth J. Dorner
*Assistant Examiner*—Jerry Redman
*Attorney, Agent, or Firm*—Kathryn A. Marra; Howard N. Conkey

[57] ABSTRACT

A vehicle door assembly includes a window movably mounted for vertical movement between a raised closed position and a lowered open position. The window includes a lower portion having a constant transverse curvature and an upper portion having an accelerated transverse curvature. The window includes a side edge. The window has a notch on the side edge of the upper portion of the window.

10 Claims, 4 Drawing Sheets

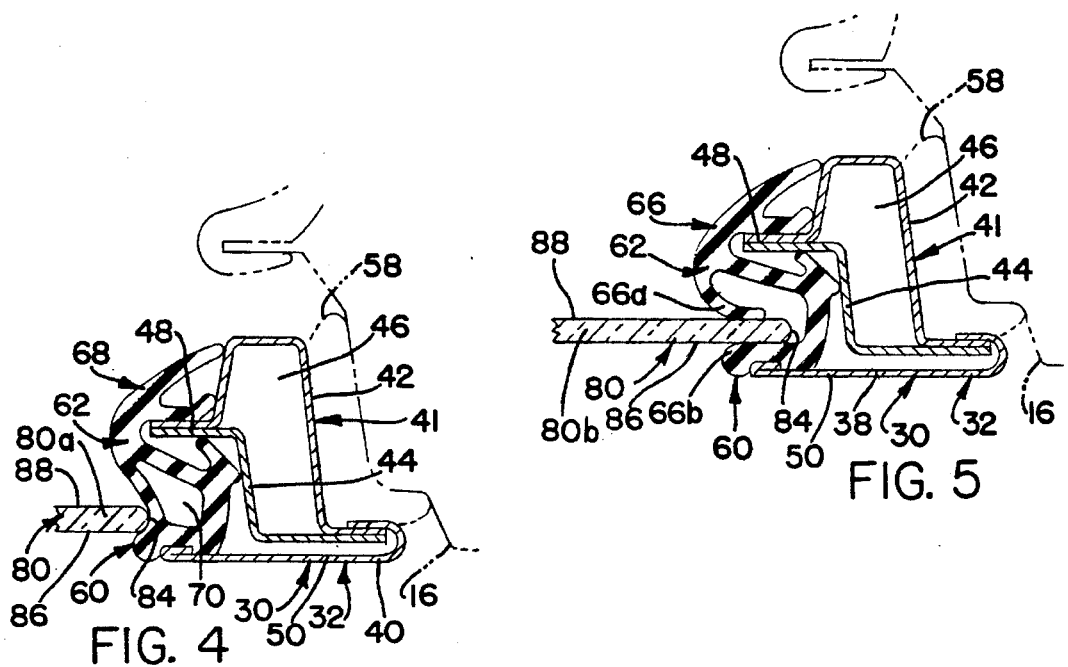
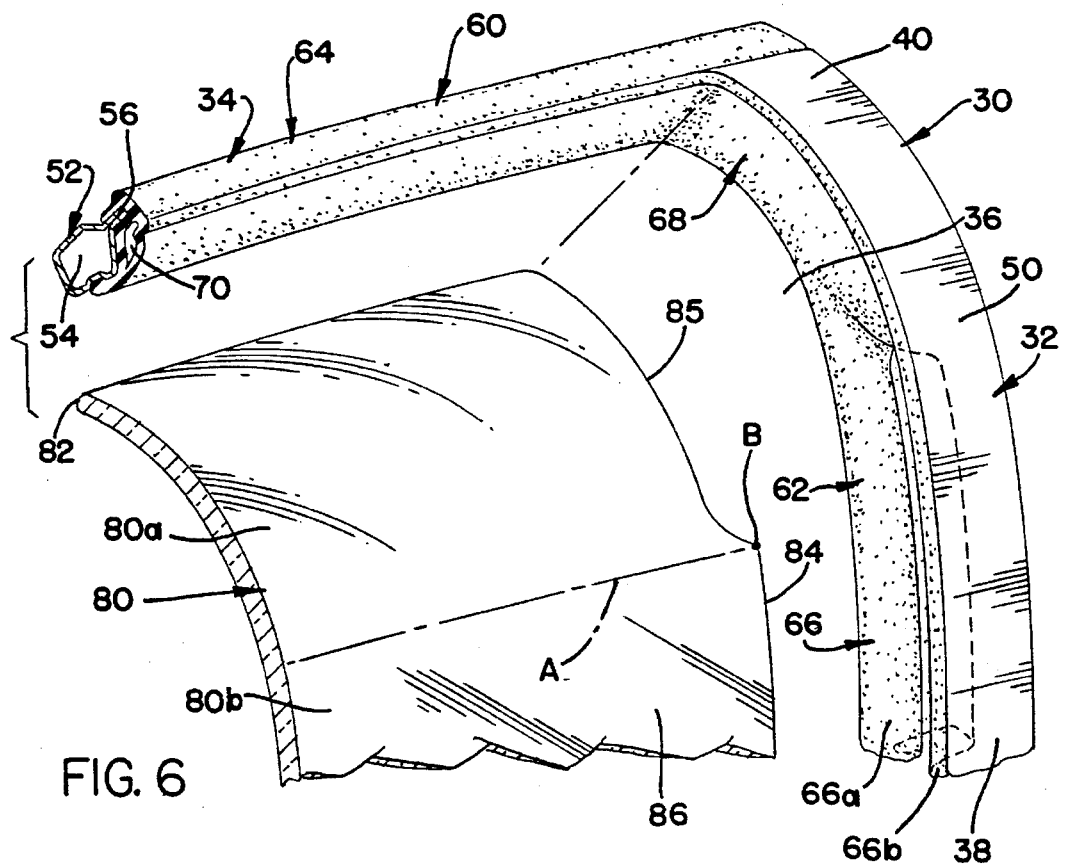

VEHICLE DOOR ASSEMBLY

This invention relates to a vehicle door assembly, and more particularly to vehicle door assembly having a window including an upper portion having an accelerated curvature for smoothly flowing into the roof of the vehicle.

BACKGROUND OF THE INVENTION

It is well know in motor vehicles to provide a side door assembly having a door window frame including an upper edge contiguous with the roof line of the vehicle. It is also well known to have the side window movable between a raised closed position and a lowered open position. The prior art discloses many curvature variations for movable side door windows including multidirectional curvatures attempting to effect a smooth transition between the window and the vehicle body.

In particular, it is highly desirable to have a transversely curved side door window which enables a smooth and rounded transition of the side door assembly into the vehicle roof for an aesthetically pleasing vehicle appearance. However, this desire for transverse curvature competes with the requirement that the side window must be vertically movable between the raised closed position and the lowered open position within the limited transverse dimensions of the side door structure.

In attempting to accomplish these competing objectives, the prior art has suggested side door windows having an upper stationary window and a lower movable window. The upper stationary window is either mounted at an angle or more highly curved than the lower window. However this arrangement has the shortcoming of requiring two pieces of glass, a seal and frame between the pieces of glass, and reducing the size of the window opening for the movable window.

SUMMARY OF THE INVENTION

This invention provides an improved vehicle door assembly providing a transversely curved side door window which enables a smooth and rounded transition of the side door assembly into the vehicle roof for an aesthetically pleasing vehicle appearance, a larger window opening, and higher roof line. Advantageously, this objective is accomplished using only a single integral window, eliminating the need for additional channels and seals. Also advantageously, this invention may be incorporated into existing vehicle side door assemblies with minimal modification of the door assembly.

To accomplish this objective, a vehicle door assembly has a single integral window movably mounted on a lower door structure for vertical movement between a raised closed position and a lowered open position. The window includes a lower portion having a generally constant transverse curvature and an upper portion having an accelerated transverse curvature greater than the transverse curvature of the lower portion. The window also includes a side edge. In accordance with a critical aspect of this invention, a notch is provided on the side edge of the upper portion of the window. Advantageously, the notch enables smooth movement of the window between the open and closed positions.

In accordance with a further aspect of this invention, the door assembly includes a side channel including a lower channel portion having a transverse curvature equivalent to the generally constant transverse curvature of the lower portion of the window. The side channel also includes an upper channel portion having an accelerated transverse curvature equivalent to the accelerated transverse curvature of the upper portion of the window. The lower channel portion of the side channel slidably engages the side edge of the lower portion of the window for guiding vertical movement of the window between the open and closed positions. This movement is advantageously enabled by the notch provided on the side edge of the upper portion of the window which is spaced apart from the upper and lower channel portions when the window is moved away from the closed position towards the open position. However, the notch engages the upper channel portion of the side channel when the window is in the closed position as enabled by the accelerated curvature of the upper portion of the side channel.

BRIEF DESCRIPTION OF THE DRAWINGS

These and other features, objects and advantages of the present invention will become apparent upon consideration of the following description of the preferred embodiment, appended claims, and accompanying drawings in which:

FIG. 4 is a sectional view taken along line 4—4 of FIG. 1;

FIG. 5 is a sectional view taken along line 5—5 of FIG. 1;

FIG. 6 is an exploded perspective view showing a door window frame assembly and window partially broken away.

DESCRIPTION OF THE PREFERRED EMBODIMENT

Figure 1:
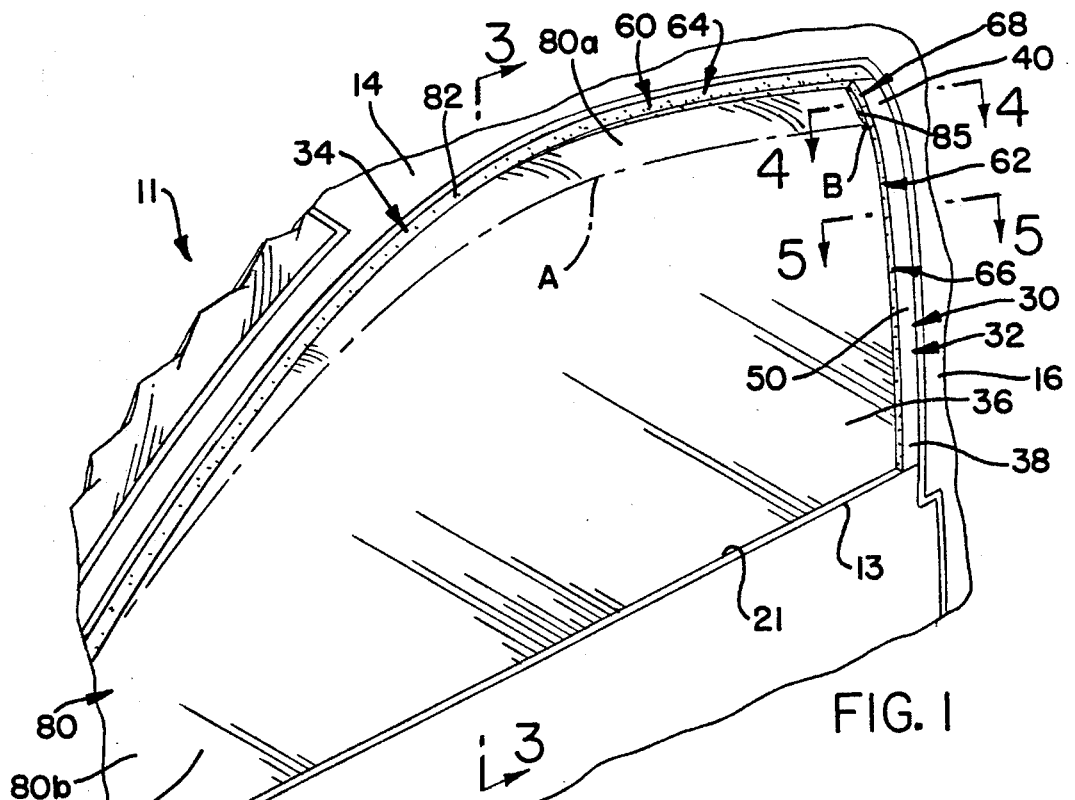
FIG. 1 is a perspective view showing a vehicle side door assembly including the window in the raised closed position.

Referring to FIG. 1, a vehicle side door assembly 10 is shown in a closed position on the vehicle 11. The door assembly 10 includes a lower door structure 12 and a door window frame assembly 30 attached to the lower door structure 12. The vehicle 11 further includes a longitudinally extending roof rail 14 and an upstanding side pillar 16.

Figure 3:
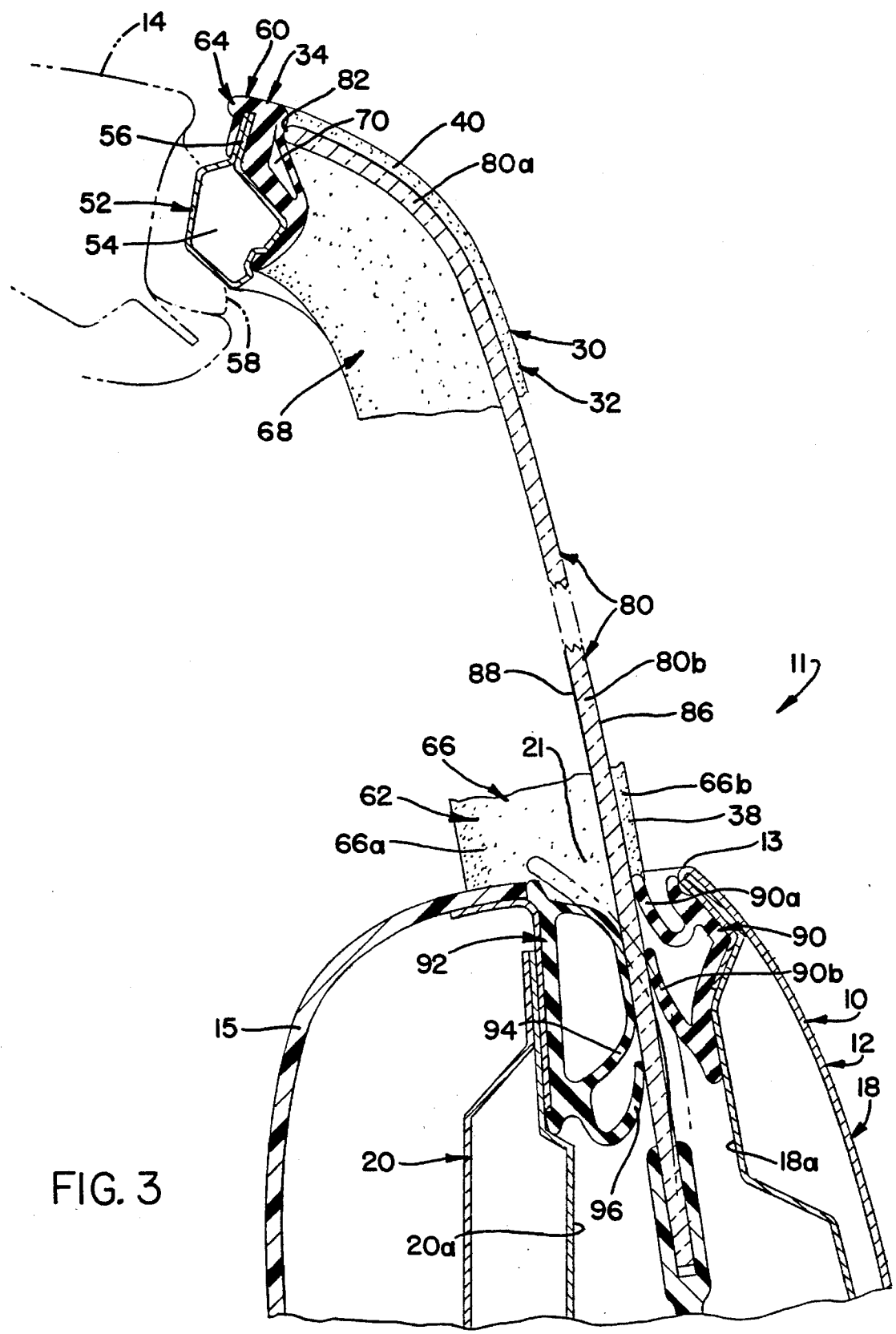
FIG. 3 is a sectional view taken along line 3—3 of FIG. 1 and showing the window partially broken away.

Referring to FIG. 3, the lower door structure 12 of the door assembly 10 comprises an outer door panel 18 spaced from an inner door panel 20. An interior trim panel 15 is secured to the inner door panel 20. The outer and inner door panels 18, 20 are formed by suitably joining sheet metal stampings. The inner door panel 20 includes an outer surface 20a and the outer door panel 18 includes an inner surface 18a. Upper ends of the outer and inner door panels 18, 20 are transversely spaced apart and define a longitudinally extending belt line 13 having a belt line opening 21 in the lower door structure 12.

Figure 2:
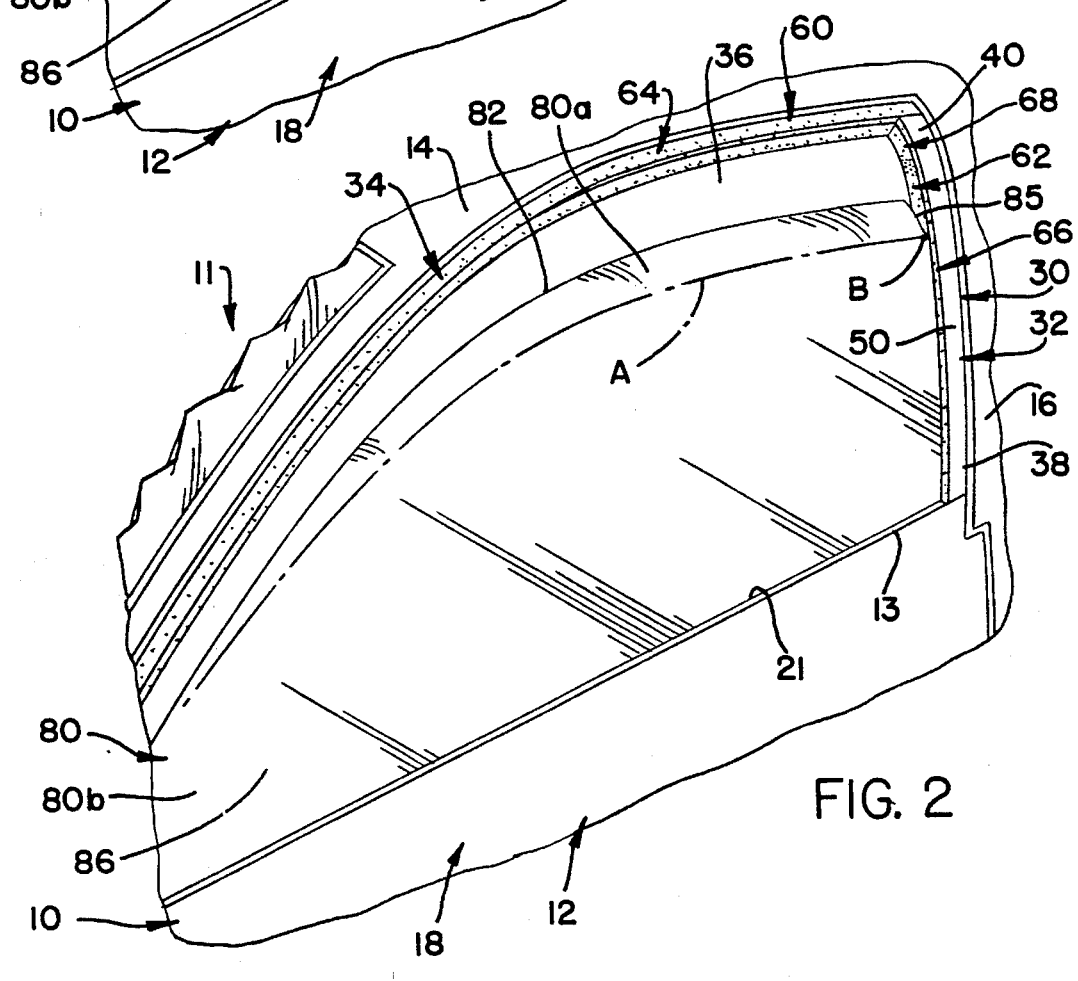
FIG. 2 is a view similar to FIG. 1, but showing the window in a partially lowered open position.

The door window frame assembly 30 is conventionally mounted atop the lower door structure 12 and has a generally inverted U-shaped configuration as best shown in FIGS. 1 and 2. The window frame assembly 30 includes a rear side channel 32 and an arcuate upper channel 34. The rear side channel 32 extends substantially vertically upward from the belt line 13 of the lower door structure 12 and intersects the upper channel 34. The upper channel 34 and rear side channel 32 of the window frame assembly 30 and the belt line 13 of the lower body structure 12 cooperatively define a window opening 36.

Referring to FIGS. 1 and 2, the rear side channel 32 of the window frame assembly 30 includes a lower portion 38 and an upper portion 40 extending upwardly from the lower portion 38. The lower portion 38 of the rear side channel 32 has a generally constant transverse curvature. The upper portion 40 of the rear side channel 32 has an accelerated transverse curvature greater than the transverse curvature of the lower portion 38 of the rear side channel 32.

As shown in FIGS. 4 and 5, the entire rear side channel 32 of the window frame assembly 30 includes a rear side rail 41 comprised of inner and outer metal stampings 42, 44 which are overlapped and joined together at their adjacent edges to form a first hollow passage 46 and an inner flange 48. In addition, an outer flange 50 formed of a sheet metal stamping is suitably secured to the inner metal stamping 42. As best shown in FIG. 3, the upper channel 34 of the window frame assembly 30 includes an upper rail 52 being a metal stamping bent to form a second hollow passage 54 and an upper flange 56.

As shown in FIGS. 3, 4 and 5, the roof rail 14 and side pillar 16 of the vehicle 11 are spaced from the upper rail 52 and rear side rail 41 of the window frame assembly 30, respectively. A conventional body seal 58 is carried by the roof rail 14 and side pillar 16 for sealably engaging the rails 41, 52 of the window frame assembly 30 when the door assembly 10 is in the closed position.

The window frame assembly 30 includes a continuous window seal 60 carried on an inner periphery of the upper and rear side rails 41, 52. The window seal 60 includes a rear side seal 62 and an upper side seal 64. The window seal 60 is preferably made of a flexible elastomeric material. The rear side and upper side seals 62, 64 are mounted on and have a transverse curvature corresponding to the transverse curvature of the rear side and upper rails 41, 52, respectively.

The rear side seal 62 of the window seal 60 includes lower and upper side seal portions 66, 68 corresponding to the lower and upper portions 38, 40 of the rear side channel 32, respectively. As shown in FIG. 5, the lower side seal portion 66 has inner and outer lips 66a, 66b carried between the inner and outer flanges 48, 50 of the rear side rail 41 on the lower portion 38 of the rear side channel 32. As shown in FIG. 4, the lower side seal portion 66 transitions or muckets into the upper side seal portion 68 having a hollow portion 70 formed by integrally joining the ends of the inner and outer lips 66a, 66b on the lower side seal portion 66. The hollow portion 70 continues along the upper side seal portion 64 of the window seal 60. Transition or mucketing between the cross sectional configurations shown in FIGS. 4 and 5 of the window seal 60 may be accomplished using conventional molding technology.

A side door window 80 is a single integral window glass and is movably mounted to the lower door structure 12 by a conventional window regulator mechanism (not shown) for vertical movement between a raised closed position, shown in FIGS. 1 and 3, and a lowered open position shown in phantom lines in FIG. 3. As best shown in the closed position in FIG. 1, a periphery of the window 80 is substantially flush with the door assembly 10.

The window 80 includes an arcuate upper edge 82 and a side edge 84. The window 80 is bent along a longitudinally extending arcuate line A to define upper and lower window portions 80a and 80b, respectively. The lower portion 80b of the window 80 has a generally constant transverse curvature as best shown in FIG. 3. The upper portion 80a of the window 80 has an accelerated transverse curvature greater than the transverse curvature of the lower portion 80b of the window 80.

Figure 7:
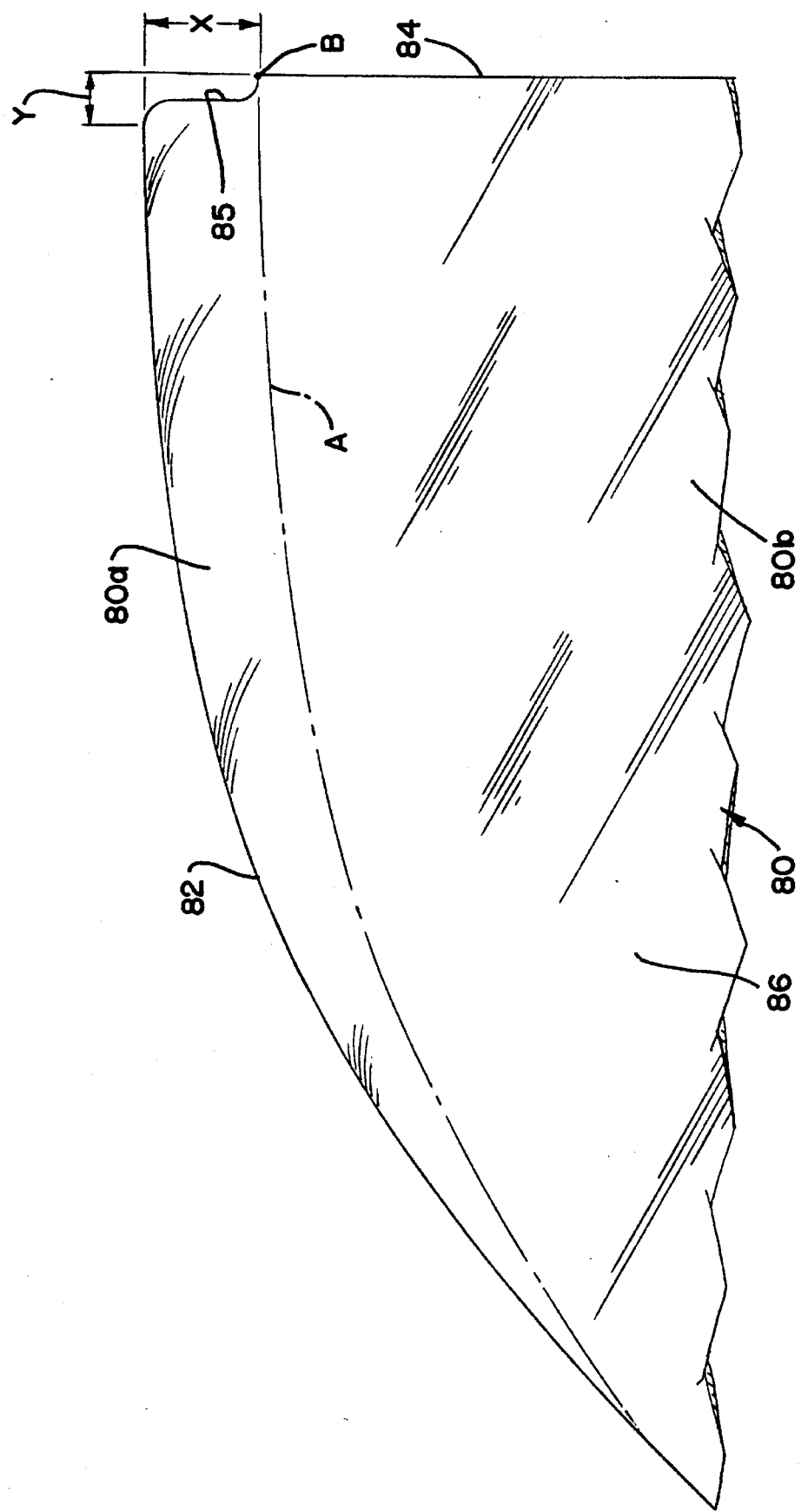
FIG. 7 is a plan view of the window partially broken away.

As best shown in FIGS. 6 and 7, the side edge 84 of the window 80 has a point B defining the intersection between the upper and lower portions 80a, 80b of the window 80. In accordance with a critical aspect of this invention, a notch 85 is included on the side edge 84 of the upper portion 80a of the window 80. The notch 85 preferably extends essentially the entire vertical height X of the upper portion 80a of the side edge 84 of the window 80. The vertical height X of the notch 85 is preferably greater than a longitudinal width Y of the notch 85. The notch 85 enables smooth vertical movement of the window 80 having the upper portion 80a with an accelerated transverse curvature, as will now be described.

Referring to FIGS. 1, 3, 4 and 5, when the window 80 is in the raised closed position, the side edge 84 of the lower portion 80b of the window 80 engages and is interposed between the inner and outer lips 66a, 66b of the lower side seal portion 66 of the window seal 60. Also in the closed position, the side edge 84 of the upper portion 80a of the window 80, including the notch 85, matably engages the hollow portion 70 of the upper side seal portion 68. As best shown in FIGS. 1 and 3, in the closed position the upper portion 80a of the window 80 is substantially flush with the roof rail 14 of the vehicle 11 such that an aesthetically pleasing smooth and rounded exterior is presented.

When the window 80 is moved away from the closed position as shown in FIG. 2, the side edge 84 of the upper portion 80a of the window 80 having the notch 85 advantageously immediately rolls forwardly and away from the upper side seal portion 68 of the rear side seal 62 and remains spaced apart from the rear side seal 62 as the window 80 moves toward the lowered open position. The side edge 84 on the lower portion 80b of the window 80, beneath point B, slidably engages the lower portion 38 of the rear side channel 32 for smooth vertical movement towards the lowered open position.

Thus, the lower portion 80b of the window 80 having a constant transverse curvature is conventionally carried by the lower portion 38 of the rear side channel 32 having the equivalent constant transverse curvature for smooth vertical movement of the window 80 between the open and closed positions. By providing the notch 85 on the side edge 84 of the upper portion 80a of the window 80, the window 80 is movable in the conventional constant curvature lower portion 38 of the rear side channel 32.

It will be appreciated that the upper portion 80a of the window 80 is preferably smaller than the lower portion 80b of the window 80, such that a larger lower portion 80b of the window 80 has a constant transverse curvature for slidably engaging the lower side seal portion 66 of the lower portion 38 of the rear side channel 32 of the window frame assembly 30.

As shown in FIG. 3, an outer lower door seal 90 is carried at the upper end of the inner surface 18a of the outer door panel 18. The outer lower door seal 90 preferably includes a pair of vertically spaced lips 90a, 90b for slidably engaging an exterior surface 86 of the window 80. An inner lower door seal 92 is carried at the upper end of the outer surface 20a of the inner door panel 20. The inner lower door seal 92 preferably includes an upper hollow bulbous portion 94 and a lower lip 96 for slidably engaging an interior surface 88 of the window 80. The hollow bulbous portion 94 provides effective sealing while biasing the upper portion 80a of the window 80 away from the inner door panel 20.

Advantageously, the accelerated curvature of the upper portion 80a of the window 80 and equivalent accelerated curvature of the upper portion 40 of the rear side channel 32 of the door frame assembly 30 enable a larger window opening 36 and higher roof rail line than conventional vehicle side windows. It will be appreciated that the window 80 having a notch 85 may be incorporated into existing door assemblies with only minor changes to the upper portion 40 of the rear side channel 32.

Although the preferred embodiment utilizes a stamped metal channel, it is also contemplated that the present invention may be utilized with a pin guided channel run which is well known in the art. It will further be appreciated that it is within the ordinary skill of the art to apply the present invention to both front and rear door assemblies.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. A vehicle door assembly comprising:

a window movably mounted on a lower door structure for vertical movement between a raised closed position and a lowered open position;

the window being a single integral window including a lower portion having a generally constant transverse curvature and an upper portion having an accelerated transverse curvature greater than the transverse curvature of the lower portion; and the window including a side edge, the window having a notch on the side edge of the upper portion of the window.

2. The vehicle door assembly of claim 1 wherein the upper portion of the window is smaller than the lower portion of the window.

3. The vehicle door assembly of claim 1 wherein the notch has a vertical height and a longitudinal width, the vertical height being greater than the longitudinal width.

4. A vehicle door assembly comprising:

a window movably mounted on the door assembly for vertical movement between a raised closed position and a lowered open position;

the window being a single integral window including a lower portion having a generally constant transverse curvature and an upper portion having an accelerated transverse curvature greater than the generally constant transverse curvature of the lower portion, the window including a substantially vertical side edge, the window having a notch located on the side edge of the upper portion of the window;

a side channel including a lower channel portion having a transverse curvature equivalent to the generally constant transverse curvature of the lower portion of the window, and the side channel having an upper channel portion connected to the lower channel portion, the upper channel portion having an accelerated transverse curvature equivalent to the accelerated transverse curvature of the upper portion of the window;

the lower channel portion slidably engaging the side edge of the lower portion of the window for guiding vertical movement of the window between the open and closed positions; and the notch on the side edge of the upper portion of the window matably engaging the upper channel portion of the side channel when the window is in the closed position, the notch on the side edge of the upper portion of the window being spaced apart from the upper and lower channel portions when the window is moved away from the closed position towards the open position;

whereby the notch enables smooth vertical movement of the window within the side channel.

5. The door assembly of claim 4 wherein the upper portion of the window is smaller than the lower portion of the window.

6. The door assembly of claim 4 wherein the notch has a vertical height and a longitudinal width, the vertical height being greater than the longitudinal width.

7. The door assembly of claim 4 wherein the lower channel portion includes a lower seal means for slidably guiding the window between the open and closed positions and wherein the upper channel portion includes an upper seal means for matably engaging the side edge of the upper portion of the window in the closed position.

8. The door assembly of claim 7 wherein the upper seal means includes a hollow portion for matably engaging the side edge of the upper portion of the window.

9. The door assembly of claim 7 wherein the lower seal means includes inner and outer lips slidably engaging the window therebetween.

10. The door assembly of claim 4 wherein the window includes an interior surface and wherein a door seal is carried by the lower body structure, the door seal having a hollow bulbous portion slidably engaging the interior surface of the window.

* * * * *